United States Patent
Klein et al.

(10) Patent No.: US 10,772,268 B2
(45) Date of Patent: Sep. 15, 2020

(54) OPTIMIZED FLOW CONTROL FOR WATER INFRASTRUCTURE

(71) Applicant: Rachio, Inc., Denver, CO (US)

(72) Inventors: Christopher Michael Klein, Denver, CO (US); Richard Clayton Kraus, Parker, CO (US); Franz David Garsombke, Golden, CO (US)

(73) Assignee: RACHIO, INC., Denver, CO (US)

( * ) Notice: Subject to any disclaimer, the term of this patent is extended or adjusted under 35 U.S.C. 154(b) by 0 days.

(21) Appl. No.: 15/675,426

(22) Filed: Aug. 11, 2017

(65) Prior Publication Data

US 2018/0042189 A1     Feb. 15, 2018

Related U.S. Application Data

(60) Provisional application No. 62/373,686, filed on Aug. 11, 2016.

(51) Int. Cl.
*A01G 25/16* (2006.01)
*G06Q 50/06* (2012.01)
(Continued)

(52) U.S. Cl.
CPC .......... *A01G 25/165* (2013.01); *A01G 25/162* (2013.01); *G06Q 10/04* (2013.01);
(Continued)

(58) Field of Classification Search
CPC ............................................ G05B 2219/2625
(Continued)

(56) References Cited

U.S. PATENT DOCUMENTS 5,479,339 A * 12/1995 Miller .................. A01G 25/167
                                                                             700/16
8,215,570 B2    7/2012   Hitt
(Continued)

FOREIGN PATENT DOCUMENTS

| IN | 201721018321 A | 9/2017 |
| WO | 9708942 A1 | 3/1997 |
| WO | 2018031911 A1 | 2/2018 |

OTHER PUBLICATIONS

Molle et al., "An exploratory survey of water management in the Meet Yazid Canal command area of the Nile Delta" Final Report, dated Dec. 2013, 124 Pgs. (Year: 2013).*

(Continued)

*Primary Examiner* — Emilio J Saavedra
(74) *Attorney, Agent, or Firm* — Dorsey & Whitney LLP

(57) ABSTRACT

Apparatuses, systems, and methods for optimizing and adjusting water usage are described. An example method may include receiving water usage data and determining a peaking factor for water usage. The peaking factor may be associated with water usage at a flow controller. A flow controller can control various types of water outlets, such as a water sprinkler for a residential home. The flow controller may be positioned along a main water supply to a property or home. The method may also include determining that the peaking factor passes a threshold water usage for the flow controller and adjusting a watering schedule of the flow controller based partly on the determination that the peaking factor passed the threshold water usage.

28 Claims, 7 Drawing Sheets

(51) Int. Cl.
*G06Q 10/06* (2012.01)
*G06Q 10/04* (2012.01)
*G06Q 50/02* (2012.01)

(52) U.S. Cl.
CPC ....... *G06Q 10/06* (2013.01); *G06Q 10/06315* (2013.01); *G06Q 50/02* (2013.01); *G06Q 50/06* (2013.01); *G05B 2219/2625* (2013.01)

(58) Field of Classification Search
USPC ......................................................... 700/284
See application file for complete search history.

(56) References Cited

U.S. PATENT DOCUMENTS

| | | | |
|---|---|---|---|
| 9,565,810 B2 | 2/2017 | Eng et al. | |
| 10,015,938 B1 | 7/2018 | Malsam et al. | |
| 10,124,358 B1 | 11/2018 | Graham et al. | |
| 2002/0062594 A1* | 5/2002 | Erickson | A01G 7/02 47/48.5 |
| 2009/0043427 A1* | 2/2009 | Addink | A01G 25/167 700/284 |
| 2009/0271045 A1 | 10/2009 | Savelle, Jr. et al. | |
| 2009/0281672 A1 | 11/2009 | Pourzia | |
| 2010/0179701 A1* | 7/2010 | Gilbert | A01G 25/16 700/284 |
| 2011/0301767 A1* | 12/2011 | Alexanian | A01G 25/16 700/284 |
| 2012/0239211 A1* | 9/2012 | Walker | A01G 25/16 700/284 |
| 2012/0323380 A1* | 12/2012 | Kobayashi | E03B 1/02 700/282 |
| 2013/0048746 A1* | 2/2013 | Littrell | G05B 15/02 239/1 |
| 2015/0039143 A1* | 2/2015 | Alexanian | A01G 25/16 700/284 |
| 2015/0223416 A1* | 8/2015 | Eng | G05B 15/02 700/284 |
| 2015/0230417 A1* | 8/2015 | Nickerson | A01G 25/16 700/284 |
| 2015/0319941 A1 | 11/2015 | Klein et al. | |
| 2017/0167890 A1* | 6/2017 | Flanzer | G01D 4/002 |

OTHER PUBLICATIONS

Tanter, "Addressing the Houses: The Introduction of House Numbering in Europe" Histoire & mesure, Dec. 31, 2009, 25 Pgs (Year: 2009).*

International Search Report and Written opinion dated Nov. 11, 2017 for PCT application No. PCT/US201/046551, 8 pages.

* cited by examiner

OPTIMIZED FLOW CONTROL FOR WATER INFRASTRUCTURE

CROSS REFERENCE TO RELATED APPLICATIONS

This application claims priority under 35 U.S.C. § 119 to U.S. Provisional Application No. 62/373,686 entitled "Optimized Flow Control for Water Infrastructure," filed Aug. 11, 2016, which is incorporated herein by reference, in its entirety, for any purpose.

FIELD

The present disclosure relates generally to controlling and improving flow control and fluid usage for fluid systems.

BACKGROUND

Water infrastructure, such as water reservoirs, piping systems, and treatment plants are designed around a particular population, density, or water usage estimate. However, often, population growth or water demand vastly increases over the original design constraints of the water infrastructure. This can lead to various issues, including significant drops in water pressure at any particular water outlet (e.g., hose or shower in a house), damage to delivery pipes and other infrastructure, as well as overextension of certain water sources, such as reservoirs or other water stores. Currently, utility companies are limited in their ability to manage the water system and infrastructure and rebuilding or renovating such infrastructure is not only time intensive, but also expensive, and typically exceeds the budgets for any governing body.

Further, changes in landscape, climate, as well as water availability, water cost, and the like, may affect the watering demands or a desired watering schedule for a particular property. However, often times these variations are not readily available or apparent to a property owner and thus the property owners do not adjust watering schedules accordingly.

SUMMARY

In one embodiment, a method for optimizing water usage in a water infrastructure is described. The method includes receiving by one or more flow controllers usage data corresponding to demand on the water infrastructure, adjusting by a processor in a server or in the one or more flow controllers a water usage schedule for one or more properties based on the usage data, and activating by the one or more flow controllers one or more water outlets for the one or more properties based on the adjusted water usage schedule.

In another embodiment, a method for adjusting water usage in a water infrastructure is described. The method includes receiving water usage data and determining a peaking factor for water usage, where the peaking factor is associated with water usage at one or more flow controllers. The method may also include determining that the peaking factor passes a threshold water usage for the one or more flow controllers and adjusting a plurality of watering schedules based partly on the determination that the peaking factor passed the threshold water usage, where each watering schedule is associated with a corresponding flow controller of the one or more flow controllers.

In yet another embodiment, a system is described that includes a server coupled to infrastructure databases and a plurality of flow controllers, where each flow controller of the plurality of flow controllers connected to at least one water outlet of a plurality of water outlets. The server also includes a non-transitory computer readable media and configured to execute instructions stored on the non-transitory computer readable media. The instructions include determining a peaking factor for water usage based partly on water usage data received from at least one flow controller of the plurality of flow controllers, where the peaking factor is associated with water usage at the plurality of flow controllers. The instructions also include adjusting a plurality of watering schedules based partly on the peaking factor, where each watering schedule is associated with a corresponding flow controller of plurality of flow controllers.

SPECIFICATION

Figure 1:
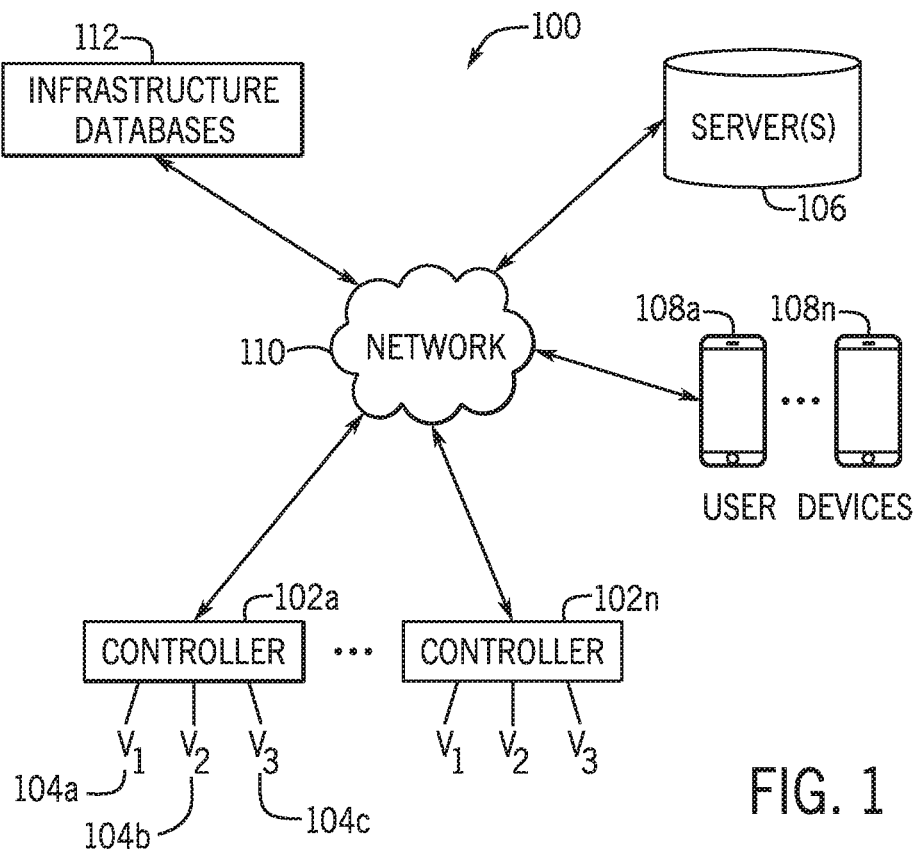
FIG. 1 is a block diagram of a system for optimizing and varying flow control for a fluid delivery infrastructure.

In some embodiments herein, an optimization flow control system for fluid infrastructure systems is disclosed. The optimization system includes multiple flow controllers that control flow to one or more flow devices or outlets in a property, external infrastructure and water data, as well as dynamic real-time monitoring of flow usage to enhance the flow patterns for a plurality of devices. In one embodiment, the system is employed to adjust the watering schedules based on time and/or day for a select number of properties. The properties may include residential areas (e.g., houses, surrounding lands, pools, yards, etc.), as well as commercial areas, common areas (e.g. grounds controlled by a home owner's association, complexes, or the like), as well as city or government properties (e.g., parks, medians, governmental buildings, or the like). In some instances, the properties may be grouped together by location, such as zip code, geography, or the like, and often may be linked based on a common water source or water delivery infrastructure (e.g. those properties that share a main fluid line).

The system stagers watering usage times, such as sprinkler valve operation or irrigation system operation, based on water data including peak water time for a particular infrastructure. For example, the system may stagger the outdoor watering schedules for five properties to ensure that all five properties do not water simultaneously and reduce large demands on the water infrastructure. By staggering the water demand, the system can alleviate issues and reduce the effect of limitations of an outdated or outgrown water infrastructure. In particular, while a main water line to a residential neighborhood may be designed to handle a density of 200 homes and currently there are 400 homes receiving water access from the main water line, by staggering the demand of the 400 homes, the water infrastructure can continue to serve each home with a desired or intended water flow pressure and water flow volume without damage to the water infrastructure.

In some embodiments, the optimization system may take into account not only water infrastructure limitations, but also usage patterns, density changes, and other variations over time. In this manner, the optimization system can satisfy the competing issues of on-demand watering, homeowner expectations, and limited resources and infrastructure capabilities.

In addition to the optimization system, the current disclosure also includes a method of adjusting local settings of groups of flow controllers using a global process. In particular, based on changes in water availability, climate, weather, new water infrastructure, or vegetation, the method may generate new templates or universal settings that can be used by individual flow controllers to adjust individualized water schedules accordingly. For example, a user can generate an update to a current model or a new model that can then be pushed down to multiple devices simultaneously. The updated model then can be used by each device individually to make specific changes to a watering schedule. As a specific example, an evapotranspiration (ETo) value or modifier can be adjusted based on changes to one or more property characteristics and this value is then transmitted to all of the affected flow controllers, which then use the updated value to adjust watering schedules accordingly. As another example, a precipitation tolerance value can be transmitted to the flow controllers that then use it to update the watering schedules accordingly. By transmitting the changes or new values to multiple controllers as a universal setting or template, the system does not have to individually adjust the multiple watering schedules to adjust for the changes. This saves significant resource time as often watering schedules are individualized based on a user's preferences, specific characteristics of the vegetation and property watered by the flow controller, and the like, and adjusting each schedule individually would require significant resources and be time intensive.

Turning now to the figures, the system of the present disclosure will be discussed in more detail. FIG. 1 is a block diagram illustrating an example of a flow optimization system 100. The system 100 includes multiple flow controllers 102a, 102n that are connected to and control a plurality of water outlets, such as a sprinkler valves, 104a, 104b, 104c. The system 100 also includes one or more servers 106, user devices 108a, 108n and one or more infrastructure databases 112. Each of the various components may be in communication directly or indirectly with one another, such as through a network 110. In this manner, each of the components can transmit and receive data from other components in the system. In many instances, the server 106 may act as a go between for some of the components in the system 100.

The network 110 may be substantially any type or combination of types communication system for transmitting data either through wired or wireless mechanism (e.g., WiFi, Ethernet, Bluetooth, cellular data, or the like). In some embodiments, certain components in the system 100 may communicate via a first mode (e.g., Bluetooth) and others may communicate via a second mode (e.g., WiFi). Additionally, certain components may have multiple transmission mechanisms and be configured to communicate data in two or more manners. The configuration of the network 110 and communication mechanisms for each of the components may be varied as desired and based on the needs of a particular configuration or property.

The flow controllers 102a, 102n are substantially any type of device that controls or regulates flow to one or more flow devices or outlets 104a, 104b. In one embodiment, the flow controllers 102a, 102n are smart sprinkler controllers that control the operation of a plurality of sprinkler valves in one or more watering zones for a particular property or area (e.g., residential property). An example of a sprinkler controller that may be used with the system 100 can be found in U.S. Publication No. 2015/0319941 filed on May 6, 2014 and entitled "Sprinkler and Method for an Improved Sprinkler Control System," which is incorporated by reference herein in its entirety. The sprinkler valves may be electronically operated, such as one or more solenoid valves, that open and close a flow path to a sprinkler head.

In other embodiments, the flow controllers 102a, 102n control various types of water outlets, and may be positioned along a main water supply to a property or home. For example, the flow controllers 102a, 102n may be configured to turn on or turn off flow for a particular property such as a valve controller connected to a main water supply line. In these embodiments, the outlets 104a, 104b, 104c may be different from one another, e.g., sprinkler valve, showerhead, toilet, washing machine, dishwasher, or the like. In this manner, it should be understood that the discussion of any particular flow outlet or flow controller is meant as illustrative only.

The server 106 is a computing device that processes and executes information. The server 106 may include its own processing elements, memory components, and the like, and/or may be in communication with one or more external components (e.g., separate memory storage) (an example of computing elements that may be included in the server 106 is disclosed below with respect to FIG. 8). The server 106 may also include one or more server computers that are interconnected together via the network 110 or separate communication protocol. The server 106 may host and execute a number of the processes exceed by the system 100 and/or the flow controllers 102a, 102n. In some embodiments, each of flow controllers 102a, 102 may communicate with specialized servers 106 that communicate with a specialized system server 106 or each may communicate with the same server 106 or groups of servers.

The user devices 108a, 108n are various types of computing devices, e.g., smart phones, tablet computers, desktop computers, laptop computers, set top boxes, gaming devices, wearable devices, or the like. The user devices 108a, 108n provide output to and receive input from a user. For example, the server 106 may transmit one or more alerts to the user devices 108a, 108n to indicate information regarding the flow controller 102a, 102n, the water outlets 104a, 104b, 104c, and/or the property being watered. The type and number of user devices 108a, 108n may vary as desired and may include tiered or otherwise segmented types of devices (e.g., primary user device, secondary user device, guest device, or the like).

The infrastructure databases 112 store or include access to data and/or sensors from various devices or information hubs. The infrastructure databases 112 may include computing devices, such as servers, user devices, or the like, that include data on environmental factors (e.g., weather tracking), utility information (e.g., average water usage for a neighborhood or house, average water pricing rates, watering restrictions, etc.), water reservoir or water source information, smart home devices (e.g., smart thermostat, alarm system), sensor data, or the like. The infrastructure databases 112 may be substantially any device or group of devices that provide environmental or external data that is relevant or correlates to the system 100. In some embodiments, the infrastructure databases 112 include data corresponding to a water utility information, such as reservoir level or percentage, delivery capacity (e.g., pipe diameter), historical use, predicted use, and future developments or construction.

Figure 2:
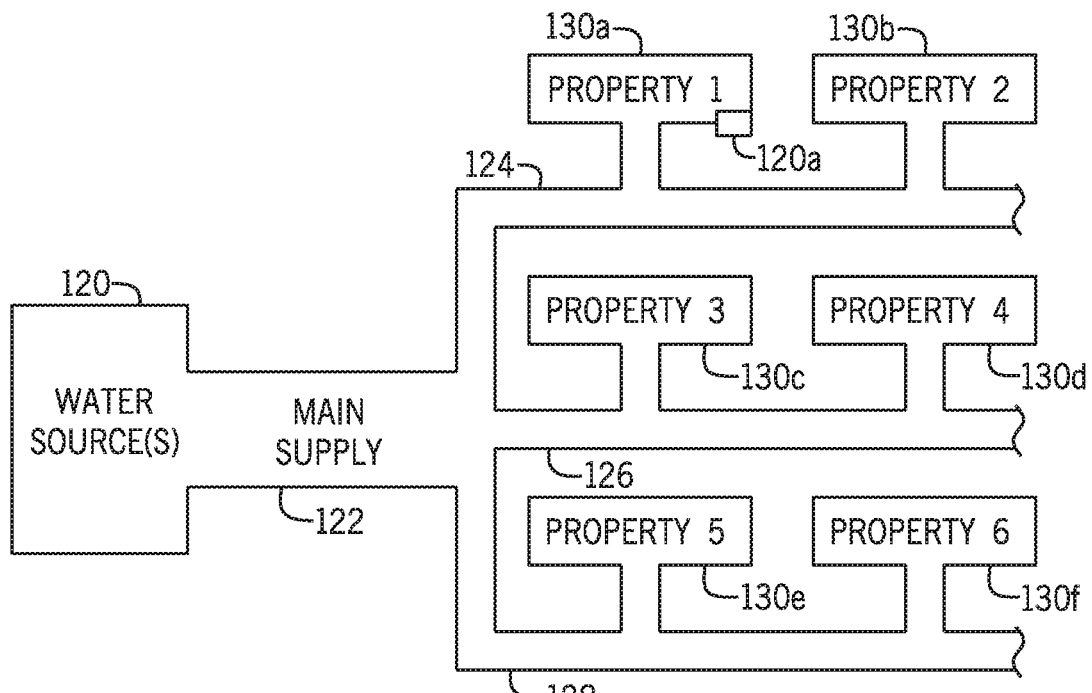
FIG. 2 is a simplified flow diagram illustrating a utility that may be optimized with the system of FIG. 1.

FIG. 2 is a simplified flow diagram illustrating an infrastructure that may be optimized with the system 100. With reference to FIG. 2, the utility includes one or more water sources 120 that supply water via a main supply 122 to multiple properties 130a, 130b, 130c, 130d, 130e, 130f directly or through one or more branches 124, 126, 128. The water source 120 may be a reservoir, water tank, lake, pond, river, stream, etc. that is used (solely or in part) to deliver water to the properties 130a-130f. The infrastructure database 112 may include data corresponding to the level of the water source 102, such as the fill height, used percentage, or the like, that is used to correlate water usage as compared to water replenishment.

The water source 120 is fluidly connected to a main water supply 122. The main supply is defined as being the main source for a particular grouping of properties and may not be the "main" supply directly from the water source, but rather a branch from a city or larger area wide water system. The main water supply 122 is typically a pipe or other flow pathway that transports fluid from the water source 120 (or from multiple water sources) to individual water outlets at the one or more properties 130a-130f. The main supply 122 is typically difficult to access and may be buried other otherwise concealed by roadways, structures, or the like.

Often, the main supply 122 is configured to supply a particular number of properties or people, e.g., 100 homes or 600 people. Because the main supply 122 is typically fixed in size and selected based on a predicted number of people, the amount of water that it can deliver to downstream properties may be predetermined and may be outdated based on the growth or eventual use of the properties. The main supply 122 includes one or more fluid branches 124, 126, 128 that fluidly connect to the various properties 130a-130f. Each of the properties 130a-130f may be connected via one or more branches, for example, each property may be fluidly connected through a branch off of the main supply 122, as well as a property specific branch that connects directly to the property. However, in other examples, other delivery pathways may be used.

The water source 120 is a reservoir or other type of storage component that stores or provides water for use with a particular area of set of properties. In some instances, the water source 120 may be configured to serve multiple properties through many different branches (e.g., a city's reservoir), but in other instances, the water source 120 may be more localized to a smaller set of properties, such as an irrigation pond in a housing development. Other water sources 120 include natural or man-made water supplies, such as underground reservoirs, rivers, desalination plants, or the like. In many instances, the water source 120 may have a predicted or known water capacity that can be used to determine an allotted water amount for any particular property 130a-130f receiving water from the water source 120. The water capacity may be increased or decreased based on the precipitation levels for a particular year or variations in the demand.

With reference to FIGS. 1 and 2, each of the properties 130a-130f, or select groups of the properties 130a-130f (e.g., two or more properties), include a flow controller 102a. The flow controller 102a detects water flow usage by the one or more properties 130a-130f fluidly connected to the controller 102a as discussed above. In some embodiments, each of the properties 130a-130f (or a large number of the properties) includes a controller 102a such that the water usage of the main supply 122 can be detected and tracked.

In some embodiments, the system 100 may be used to control and track the water usage of multiple properties, e.g., a plurality of residential homes, an apartment or condominium complex, commercial complex (e.g., business park), or the like. In these embodiments, the system may communicate with multiple flow controllers 102a-102f for each of the various properties. Each of the properties 130a-130f include indoor flow sources and outdoor flow sources 104a-104c. These flow sources may be connected to one or more flow controllers 102a-102n In some embodiments, the flow controllers 102a-102n may be configured to distinguish indoor water usage from outdoor water usage for each property 130a-130f, but in other examples, the flow controllers 102a-102n may be configured to detect overall usage for the property 130a-130f (regardless of the type) or may be configured to detect either indoor/outdoor or a specific type of use (e.g., sprinkler/irrigation use). The type of water usage detected may be by the controllers 102a-102n directly or indirectly.

Figure 3:
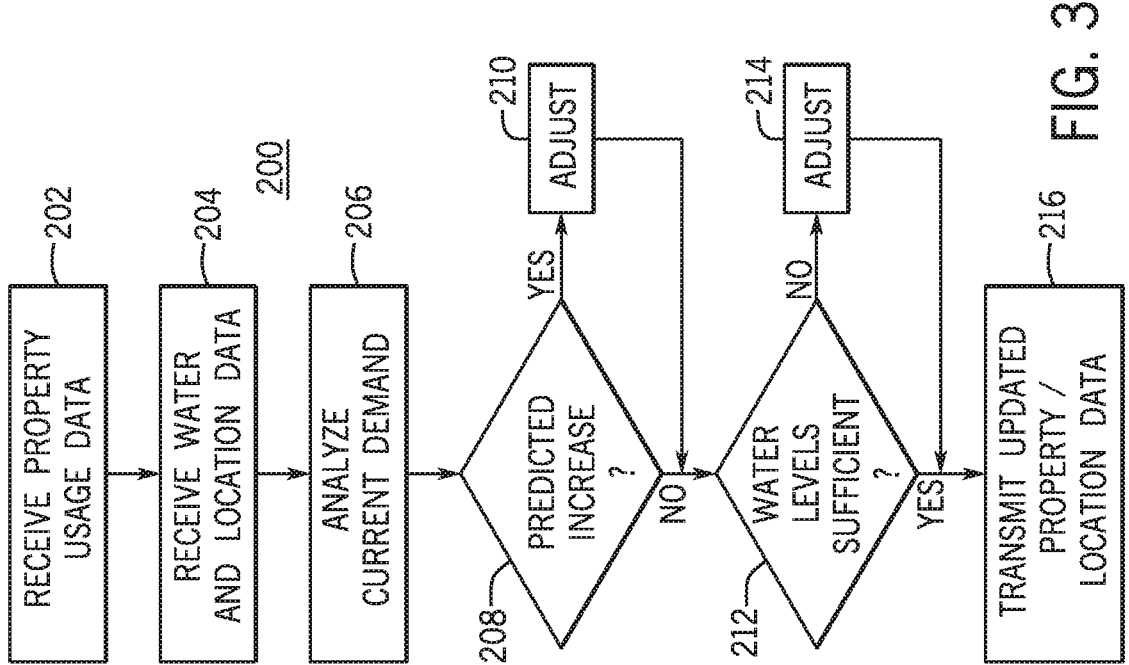
FIG. 3 is a flow chart illustrating a method of the system of FIG. 1 to modify water usage for various properties based on capacity and demand.

FIG. 3 is a flow chart illustrating a method of the system 100 to modify water usage for various properties 130a-130f based on capacity and demand. With reference to FIG. 3, the method 200 may begin with operation 202 and the server 106 receives property usage data from the one or more controllers 102a-102n. The property usage data is collected and stored by each controller 102a-102n at one or more of the properties 130a-130f and is detected through monitoring the water usage of each property (or group of properties). For example, each of the controllers 102a-102n may detect the time, amount, and dates of outdoor irrigation for a select property 130a-130f. Additionally or alternatively, each of the controllers 102a-102n may detect indoor water usage times, amounts and dates (e.g., water usage corresponding to showers, baths, dishwashers, washing machines, or the like). This water usage data for each property 130a-130f is transmitted by the respective controller 102a-102n to the server 106 through the network 110.

After operation 202, the method 200 may proceed to operation 204. In this operation 204, the server 106 receives the water and location data from the one or more infrastructure databases 112. The water and location data corresponds to information corresponding to the water source 120, main supply 122, and optionally location data corresponding to the properties 130a-130f. For example, the water source 120 data includes information regarding the fill level (e.g., 100%, 80%, or the like), the main supply 122 data may include information corresponding to the diameter of flow pipes and/or branches 124, 126, 128, as well as the number of properties fed from the main supply 122. Other infrastructure data that is transmitted to the server may include census or population data corresponding to the number of people in the location served by the water source 120 or main supply 122, the number of properties within the service area, the predicated usage for a select time frame, as well as historical usage, weather patterns, other available water sources, such as water rights information (e.g., water legal entitlements) that could include information regarding other water sources that may be purchased (outside of water source 120) and/or data from other water districts that may be purchased or swapped, as well as information on the beginning of the water source (e.g., lower or upper basin). The types of infrastructure data from the infrastructure databases 112 may be varied based on the type of tracking and control desired.

Additionally, it should be noted that the examples may be inputs stored within the server 106, rather than pulled dynamically from the databases 112. For example, when the system 100 is initially activated, a user may input certain infrastructure data, such as data that may not change year to year (e.g., infrastructure capacity, pipe diameters, etc.), that the server 106 can reference. Other data, such as property numbers, population, usage, etc. may be input dynamically or at select time periods (e.g., a few times a year, once a month, or the like).

With continued reference to FIG. 3, after operation 204, the method 200 may proceed to operation 206 and the server 106 analyzes the current demand. In particular, the server 106 compares the property usage data from operation 202 to the infrastructure data from operation 204 to determine the current demands and usage of the water system. By analyzing the demand, the server 106 may determine peak usage times for water, typical amounts of water, stresses exhibited on the main supply 122, branches 124, 126, 128, and/or water source 120, as well as other trends and data corresponding to the After operation 206, the method 200 may proceed to operation 208 and the server 106 determines whether there is a predicated increase in the demand on the water infrastructure. For example, the server 106 may determine that a new development of residential properties is being added to a particular location that will need to access a select water source 120 or main supply 122. As another example, the server 106 may assess the current water usage for each of the properties 130a-130f and determine that the water usage has been increasing over the original demand or predicted usage, such as due to a drought and need for more irrigation for vegetation. Other examples include analyzing economic data regarding the geographic location, climate change data (e.g., temperature, vegetation, insect infestation, changes in snowpack, forest fires, and thinning of forest information) as well as other types of growth information to assess whether the location may experience a growth in population and/or properties in the future.

If an increase in water demand is expected, the method 200 may proceed to operation 210 and the server 106 may adjust one or more settings for each of the flow controllers 102a-102n in the select area. The settings may include watering amounts, watering schedules, notification types or frequency, providing usage information to property owners, or the like. The types of settings that may be adjusted may be varied based on the type of increase predicted, as well as the type of water sources controlled or monitored by the flow controllers 102a-102n. The sever 106 may push the settings changes to multiple controllers 102a-102n simultaneously, individually, or in select groupings (see FIGS. 4, 6, and 7).

If no increase is predicted in operation 209 or after the settings have been adjusted in operation 210, the method 200 may proceed to operation 212. In operation 212, the server 106 may determine whether the current water levels in the water source 120 are sufficient for the current or predicted usage. For example, the server 106 may analyze the usage data, along with infrastructure data from the infrastructure databases 112 to determine whether the current or expected water levels in the water source 120 can handle the current and expected demand. The analysis may include current demand, predicted demand, as well as current water levels. If the water source 120 is above capacity (e.g., 130%), then although an increase in demand may be expected, the server 106 may determine that the water levels of the water source 120 are sufficient. As another example, if the water source 120 is below capacity and an increase in demand is expected, then the water levels may be determined to be insufficient. The analysis may vary based on the water source 120, the location area, as well as other factors including weather patterns, growth, or the like. In some embodiments, operations 208 and 212 may be combined together in a single analysis performed by the server 106 to determine whether anything should be adjusted in light of predicted usage and water levels.

If in operation 212 the server 106 determines that the water levels are insufficient, the method 200 may proceed to operation 214. Operation 214 may be similar to operation 210 and the server 106 may adjust one or more settings or characteristics of the flow controllers 102a-102n to account for the expected water levels. For example, if the water source 120 is low, the server 106 may instruct each of the flow controllers 102a-102n to reduce outdoor watering times or other usage by a particular percentage in order to save water. As another example, if the water source 120 is high, the server 106 may allow increases in watering times or schedules. Additionally, other settings that can be modified include user notification types and frequency, water restriction times, water pricing (e.g., dynamic pricing may be used during peak demands), zone modifications (e.g., platform can offer rebate dollars to switch out a portion of the grass zones to a less water-intensive type of vegetation), or options to switch out certain water fixtures such as more water efficient sinks, toilets, and the like.

In both operations 208 and 212, the sever 106 may make dynamic adjustments based on the predicted usage and water levels and/or may include input from utility or government entities. For example, the server 106 may provide or receive usage and water level data from one or more outside entities, that may also provide guidance to adjust settings for the flow controllers. In other examples, the server 106 may adjust the flow controllers 102a-102n using the infrastructure and usage data without input from external entities. The level of input and control of utilities or government entities may vary based on the location and the number of controllers, as well as the structure of the system 100.

After operation 212, the method 200 may proceed to operation 216 and the server 106 may transmit the various property and location data updates to the flow controllers 102a-102n and/or user devices 108a-108n. As noted above, in some embodiments, the server 106 may transmit changes to the flow controllers 102a-102n in groups simultaneously, individually, or in select groups. Additionally, in some embodiments, the server 106 may transmit setting adjustments and/or usage and water data. That is, in some instances, the server 106 may adjust various settings of the flow controllers themselves, but in other embodiments, the server 106 may provide updated data to the flow controllers 102a-102n which may then make any changes locally. In some instances, the server 106 may adjust select settings globally for a set of flow controllers and other settings may be adjusted locally by the flow controllers 102a-102n by themselves.

Figure 4:
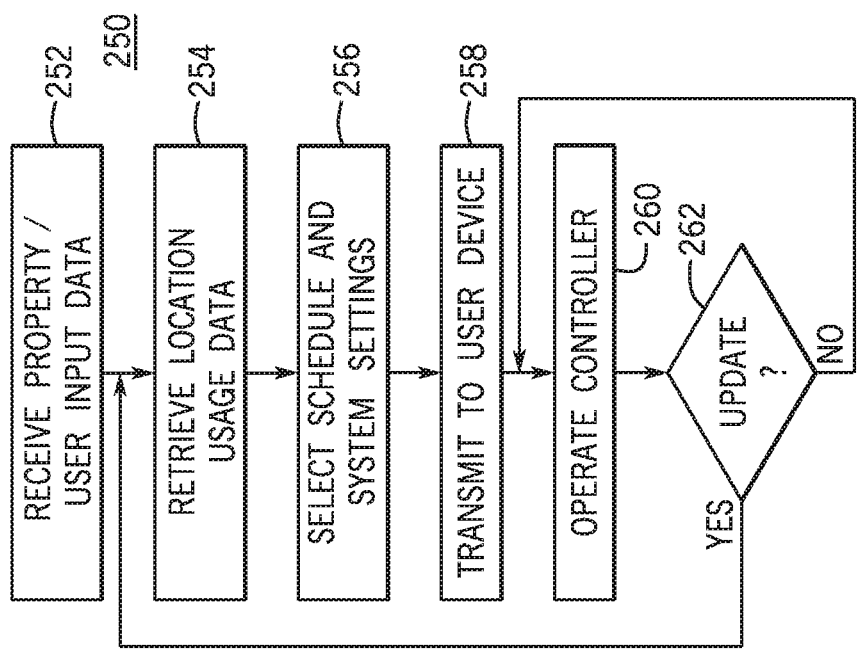
FIG. 4 is a flow chart illustrating a method for adjusting flow controller settings and characteristics.

A method for adjusting the flow controllers 102a-102n based on water usage data, water source 120 data, and infrastructure data will now be discussed. FIG. 4 is a flow chart illustrating a method for adjusting flow controller settings and characteristics. With reference to FIG. 4, the method 250 may begin with operation 252 and the flow controller 102a-102n receives property and user input data. The property and user input data may include data corresponding to the property 130a-130f that the flow controller 102a-102n is connected to, e.g., vegetation type, soil characteristics, weather patterns, number of sprinkler valves, number of zones, property area, water source outlet information (e.g., types of houses, sprinkler valves, showerheads, toilets, etc.), as well as the number of controllers 102a-102n (e.g., some properties may have more than one controller). The property and user input data may be input directly into the controller 102a-102n by the user, such as through an input/output interface, or may be received from the controller 102a-102n via the server 106 or other computing device. In some embodiments, the controller 102a-102n may also detect property information such as through one or more flow sensors, calibration patterns, or the like.

After operation 252, the method 250 may proceed to operation 254. In operation 254, the flow controller 102a-102f receives location usage data from the server 106. This data includes the water usage information (e.g., historical and predicted use), water levels, and other infrastructure data from the infrastructure databases 112. The location usage data may be transmitted to the flow controllers 102a-102n as part of operation 216 in method 200 (e.g., as raw data or adjusted settings for the flow controllers), or may be transmitted separately from the server 106 as raw data or directly from the infrastructure databases 112.

After operation 254, the flow controller 102a-102n selects schedule and system settings. The schedule may include a watering schedule, such as for irrigation and other outdoor usage, as well optionally indoor water use schedules, such as run times for washing machines, dishwashers, and other elements. In embodiments where the watering schedule corresponds to an irrigation schedule, the schedule includes times, dates, and run-times for various sprinkler valves, which may be determined by sprinkler zones having multiple valves, or on a valve-by-valve basis. The schedule will determine the operation of multiple water outlets for the property 130a-130f.

In a specific example, the flow controller 102a-102n adjusts the watering schedule for one or more properties 130a-130n to adjust for peak demand on the main supply 122. For example, most properties 130a-130n fluidly connected to the main supply 122 may require water usage during the weekday morning hours of 6 am to 9 am while people are getting ready for work, as well as watering outdoor vegetation. Using the usage data, the flow controller 102a-102n may select an outdoor watering schedule that is outside of the peak usage times, e.g., either before or after the 6-9 am hours in order to reduce the overall demand on the main supply 122 during this time. As the peak demand information may be transmitted to multiple flow controllers 102a-102n within a particular geographical location, the demand on the main supply 122 may be reduced and even though the main supply 122 may serve a large population or property number than its original design was intended to do, by spacing out the demand over a period of time, the main supply 122 and other infrastructure (e.g., water supply 120 and branches 124, 126, 128) can accommodate the growing demand and usage.

Other types of adjustments may be determined dividing properties 130a-130n into select groups, either based on geographic location, address type, typical watering demands, or the like, and the flow controllers 102a-102n can select schedules for each of these properties ensuring that certain properties activate their outdoor usage together. For example, if a first property 130a has a large outdoor watering demand and a second property 130b has a low outdoor watering demand, the flow controllers 102a-102n for each of these two properties may coordinate (via the server 106) such that the two properties can operate together. On the contrary, a third property 130c may have a large outdoor demand as well and the system 100 may help to ensure that the first property 130a and the third property 130c do not activate their outdoor irrigation systems at the same time or day, reducing the overall load for the infrastructure.

As another example, the flow controllers 102a-102n for certain properties 130a-130n may be set to activate on certain days of the week, and other flow controllers for other properties may be set to activate on the other days of the week. In this manner, each of the properties 130a-130n served by the main supply 122 may be alternatingly activated, such that all of the properties are not activated together. This spaces out the demand on the system, allowing for the system to more easily accommodate growing demand, as well as unexpected changes to the water resource levels.

After operation 256, the method 250 may proceed to operation 258. In operation 258, the flow controller 102a-102n may transmit the schedule or settings to the user devices 108a-108n. The flow controller 102a-102n may transmit the schedule or settings either directly or indirectly to the user devices 108a-108n (e.g., through the server 106) or directly via the network 110. The transmission to the user device 108a-108n may include data corresponding to the selected schedule (e.g., watering times for a particular sprinkler zone), as well as other data, e.g., usage data compared to surrounding properties, infrastructure data, or the like. The type of data transmitted to the user device 108a-108n may be varied as desired.

After operation 258, the method 250 may proceed to operation 260 and the flow controller 102a-102n may operate. In this manner, the flow controller 102a-102n may control the various flow outlets for the properties 130a-130n based on the schedule, e.g., activate sprinkler valves on a predetermined schedule, provide user notifications, and activate other elements. The operation of the controller 102a-102n may include dynamic variations based on changes to weather, vegetation, user demands, or the like.

With continued reference to FIG. 4, after operation 260, the method 250 may proceed to operation 262. In operation 262, the flow controller 102a-102n determines whether an update to the settings and schedule may be desired. For example, the flow controllers 102a-102n may check every few months (e.g., on a quarterly basis) or other select time period for updated data that could vary the settings for the devices. Alternatively or additionally, the flow controllers 102a-102n may be selected to check for updates based on communications from the server 106, user input, randomly, or based on other changes to the property (e.g., changes in vegetation, weather, or soil). If the flow controllers 102a-102n are to be updated, the method 250 returns to operation 254. However, if the flow controllers 102a-102n do not need to be updated, the method 250 may return to operation 260 and continue to operate the flow controllers 102a-102n.

Figure 5:
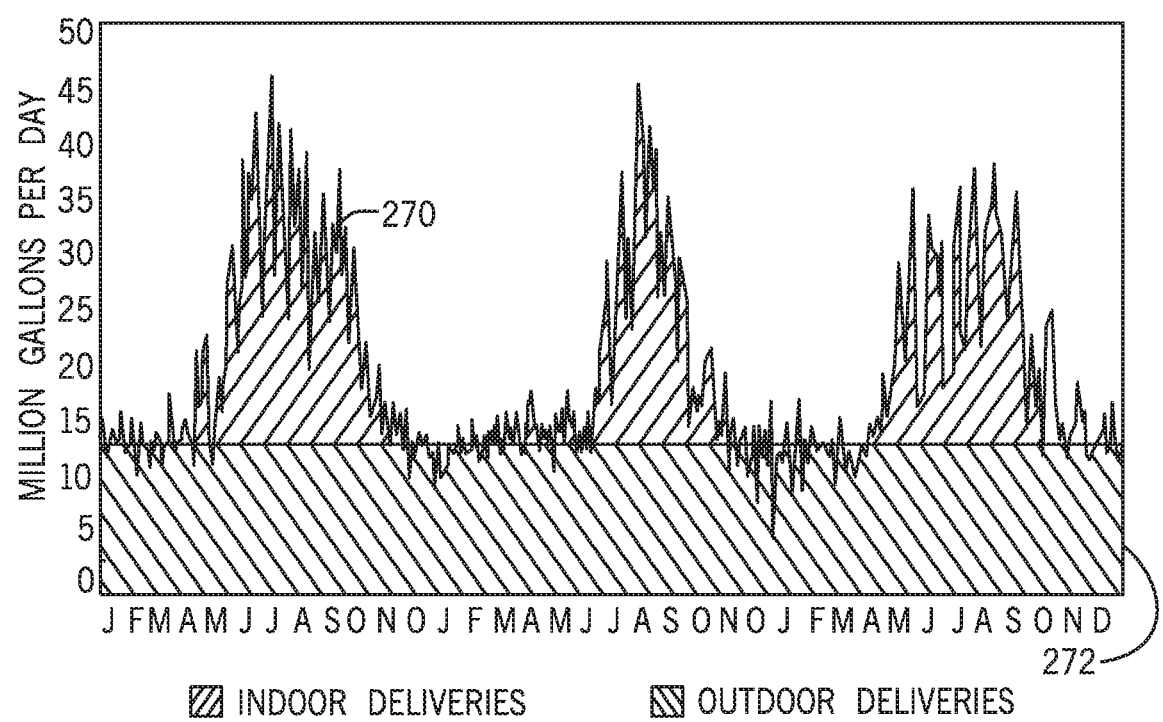
FIG. 5 illustrates an example of a chart comparing outdoor water usage and indoor usage over time.

Using the methods 200, 250 of FIGS. 3 and 4, the system 100 can optimize watering for various properties 130a-130n that can allow overtaxed infrastructure to be able to accommodate current demand, as well as expanding demands. FIG. 5 illustrates an example of a chart comparing outdoor water usage 270 and indoor water usage 272. As shown in FIG. 5, outdoor water usage, such as a due to irrigation, peak demand can be 2.5 to 3 times that of the baseline usage (e.g., typical indoor usage 272). As shown in FIG. 5, outdoor watering can generate a large demand on the infrastructure and main supply 122 for small periods of time. By using the methods 200, 250 the outdoor demand can be more evenly spaced across time to reduce the demand peaks, reducing the peak load on the main supply 122 and other components of the water infrastructure. Because water infrastructure may be designed to accommodate peak demand, by smoothing the peaks and evenly distributing the demands across multiple time periods, older infrastructures can be configured to handle increases in demand, without structural changes to the system.

In some embodiments, the system 100 may provide updated settings to groups of controllers 102a-102n simultaneously. The settings can then be used to adjust the particular watering schedule of controllers that may be individually customized or selected based on user and property characteristics and preferences. For example, in some instances, changes to water infrastructure or demand, weather patterns, vegetation, or the like, may affect a large number of properties. Individually adjusting a watering schedule for each controller 102a-102n would be a time and user intensive process and not possible for certain users (e.g., landscapers or large property owners) that operate multiple controllers 102a-102n.

Figure 6:
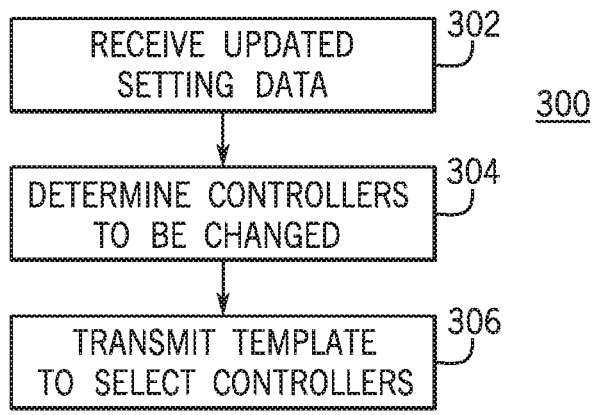
FIG. 6 is a flow chart illustrating a method for generating updated universal settings for multiple flow controllers.
Figure 7:
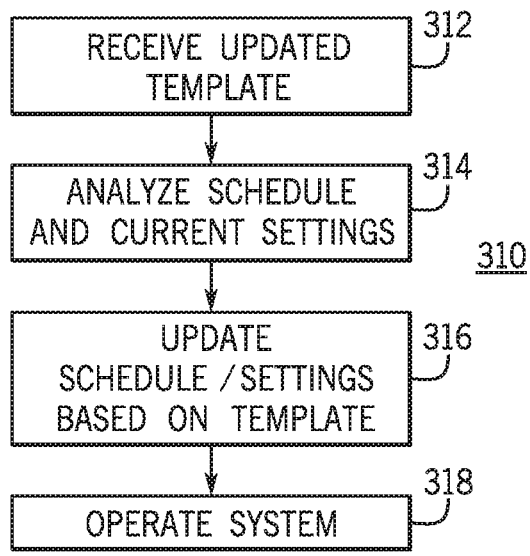
FIG. 7 is a flow chart illustrating a method for modifying local flow controller settings using a universal template change.

FIG. 6 is a flow chart illustrating a method 300 for generating updated universal settings for multiple controllers. FIG. 7 is a flow chart illustrating a method 310 for modifying controller settings based on a universal template change. With reference initially to FIG. 6, the method 300 may begin with operation 302 and the server 106 may receive updated setting data. The updated setting data may include changes such as ETo values or percentages, perception tolerance that affects the amount of precipitation required to adjust a watering schedule, filtering of types of vegetation that could grow in a region with customer root depths set by the municipality to ensure proper watering for that type of plane in a specific region, filtering of soil types specific to a region, available watering dates (e.g., property addresses could be assigned watering windows based on odd or even addresses and the controller then would determine how to fit the schedule within the assigned watering window). The updated setting data may be dynamically determined based on various inputs to the server 106, input by a system manager, or the like. During this operation, a user may utilize an application program interface (API) that sets a select routine, protocol, and tools for creating a template for the controllers to model the new settings.

After operation 302, the method 300 proceeds to operation 304 and the server 106 determines the controllers 102a-102n to be modified. For example, the server 106 may determine a particular setting change for a select geographic region and then search for controllers 102a-102n within that region to be changed. As another example, the server 106 may determine a setting change that will affect only properties over a certain area and determine controllers that fit within that area description. Other factors include number of zones or valves controlled by a particular controller, types of vegetation within a particular zone, weather zone, user watering preferences, user (e.g., owner of the controllers), or the like.

Once the updated setting data is selected and the template created, and the controllers 102a-102n to be modified have been determined, the method 300 may proceed to operation 306. In operation 306, the server 106 transmits the template to the select controllers 102a-102n. For example, the server 106 transmits the data as a software update to the controller, changing schedules and possibility restrictions on the manual control of the controller, altering the firmware. In some embodiments, most of the processing can be done be the server 106, but may affect functionality of the hardware of the controller 102a-102n. In short, the updated setting data allows a user to avoid having to individually adjust individual controllers to execute changes across multiple devices, as the template (which may be user defined or automatically defined by the server) can be used to dynamically adjust the individualized settings.

Once the template has been transmitted to the controllers 102a-102n, the controllers 102a-102n can then use the template to adjust localized and individual settings. With reference to FIG. 7, in one embodiment, the method 310 for receiving the templates from the controllers 102a-102n begins with operation 312 and the controllers 102a-102n receive the updated template from the server 106. As noted above with respect to operation 306, in this example, the controllers 102a-102n may receive the template either directly or indirectly from the server 106 via the network 110 or through a hardwired or other communication mechanism.

After the controllers 102a-102n receive the template, the controllers 102a-102n analyze the current watering schedules and settings based on the updated template. For example, the controllers 102a-102n may review the current watering schedules and settings to determine whether the settings should be adjusted based on the global changes to a template, e.g., whether the vegetation, soil, weather, or the like, may be included in the watering changes. In some instances the template may only affect certain types of vegetation or soil and the controller 102a-102n may not include the affected type.

After operation 314, the method 310 may proceed to operation 316 and the controller 102a-102n may update schedule or settings based on the template. In instances where the controller may include a schedule or settings that are unaffected by the template change, the controller 102a-102n may omit this operation. However, in instances where the template will change variations in the schedule the controller 102a-102n will update all individual and local settings to account for the global change.

As a specific example, the template may include a variation in a % ETo modifier that impacts a watering scheduling by changing the evaporation estimate for vegetation and soil. In this example, a change may reduce or increase a desired watering time and thus change the on/off times for particular zones. As another example, the template may include a change in a precipitation tolerance that may apply to modifications in a set schedule, e.g., postpone or cancelation of a preset water schedule based on a predetermined amount of precipitation. In this example, the controller 102a-102n may adjust or replace a software algorithm used to determine whether a watering should be skipped or postponed.

After the flow controllers 102a-102n adjust the localized settings, the method 310 may proceed to operation 318 and the controllers 102a-102n operate the system. The operation includes the select activation and/or monitoring of various water outlets.

Using the method 300, 310 of FIGS. 6 and 7, the system 100 can easily adjust local settings for a large selection of controllers 102*a*-102*n* without requiring the server 106 to push through individual settings for each of the controllers 102*a*-102*n*. This greatly enhances the speed and efficiency at which new settings can be implemented at a local level for specific properties and controllers 102*a*-102*n*.

In particular, the template allows for a subscribe type of architecture as opposed to a publish architecture. With a publish type of architecture, a water manager might receive a notification any time a new serialized controller is activated and then make updates to any number of settings individually for that controller. With the template, a subscribing architecture can be used where as soon as a new serialized controller is activated, the server 106 analyzes information about that controller, say address, and then automatically assigns any number of templates to that controller based on its information, making adjustments to the controller's settings without any interaction from a water manager. This helps to greatly increase the speed of the process for registering a flow controller 102*a*-102*n*, especially in instances where a manager or other user may have multiple flow controllers 102*a*-102*n* across many properties that may have varying characteristics.

Figure 8:
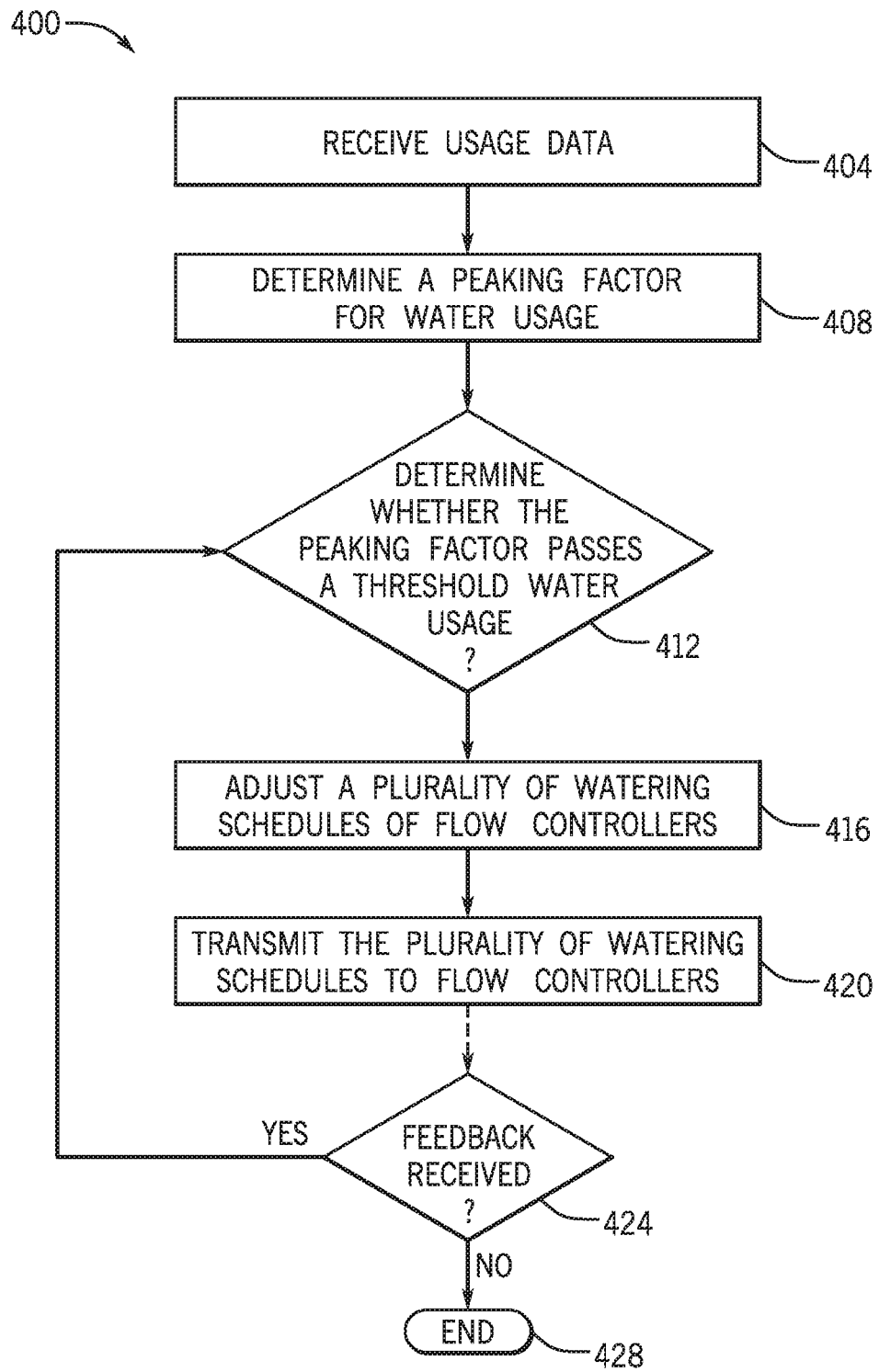
FIG. 8 is a flow chart illustrating a method for adjusting watering schedules.

A method for adjusting the flow controllers 102*a*-102*n* based on water usage data, water source 120 data, and infrastructure data will now be discussed. FIG. 8 is a flow chart illustrating a method for adjusting flow controller schedules. With reference to FIG. 8, the method 400 may begin with operation 404 and the server 106 receives water usage data, such as water trend data from a water utility, watering schedules associated with the flow controllers 102*a*-102*n*, or forecasted weather data. Some water usage data may be stored at a local database or memory connected to the server 106. In such a case, the server 106 may receive usage data from the local database (e.g., infrastructure databases 112) or memory. For example, the server 106 may receive watering schedules that have been stored in local database based on a calculation or computation of the schedule according to the current watering schedules and settings of the flow controllers 102*a*-102*n*.

Water usage data may also include property and user input data, such as data corresponding to the property 130*a*-130*f* of the flow controller 102*a*-102*n* (e.g., vegetation type, soil characteristics, weather patterns for the property, number of sprinkler valves, number of zones, property area), water source outlet information (e.g., types of houses, sprinkler valves, showerheads, toilets, etc.), as well as the number of controllers 102*a*-102*n*. Water usage data may also include data regarding changes, including but not limited to: ETo values or percentages, perception tolerance that affects the amount of precipitation required to adjust a watering schedule, filtering of types of vegetation that could grow in a region with customer root depths set by the municipality to ensure proper watering for that type of plane in a specific region, filtering of soil types specific to a region, available watering dates. Water usage data may also include data regarding zones, including but not limited to: a number of zones or valves controlled by a particular controller, types of vegetation within a particular zone, weather zone, user watering preferences, user (e.g., owner of the controllers), or the like. Water usage data may also include location usage data, including but not limited to: water usage information (e.g., historical and predicted use), water levels, and other infrastructure data from the infrastructure databases 112.

After operation 404, the server 106 determines a peaking factor for water usage at various associated (e.g., connected to server 106) flow controllers, such as flow controller 102*a*-102*n*, at operation 408. As described above with reference to FIG. 5, outdoor water usage 270 may fluctuate with respect to indoor water usage 272, making peak demand up to 2.5 to 3 times that of the baseline usage (e.g., typical indoor usage 272). The relative amount of fluctuation of the outdoor water usage 270 with respect to the indoor usage 272 may be referred to as a peaking factor. In some examples, a peaking factor may quantify the relative amount of fluctuation with respect to outdoor water usage relative to baseline overall water usage. For example, overall water usage may be both outdoor and indoor water usage. A baseline water usage may refer to a water usage over a particular time-period. Accordingly, baseline overall water usage may refer to outdoor and indoor water usage over a month, day, hour, or the like.

A peaking factor may be quantified with respect to a time measure such as an annual scale, a monthly scale (e.g., as shown in FIG. 5), a weekly scale, a daily scale, an hourly scale, or the like. Overall water usage may also fluctuate at certain hours in a day such that even during a peaking period (e.g., a summer period where outdoor water usage rises with irrigation demand), such that a peaking factor may refer to the relative amount of fluctuation in comparing the additional water usage on the water infrastructure as compared to that peaking period. For example, in the month of August where water usage may already be experience overall monthly peak demand, additional water usage during the hours of 6 .am-9 .a.m above that monthly peak demand may refer to a peaking factor for that hourly peak demand. In the example, additional water usage during the hours of 6 a.m.-9 a.m. may be indoor water usage such as people getting ready for work (e.g., showering) and/or lawns being watering during non-peak sunlight intensity hours (e.g., non-peak may refer to certain times outside of a range of hours defined by solar noon). By using the methods 400, 450 the outdoor and indoor water usage can be more evenly spaced across time to reduce the demand peaks, reducing the peak load on the main supply 122 and other components of the water infrastructure. In other words, the peak demand may be smoothed or compensated with this process. Because water infrastructure may be designed to accommodate peak demand, by smoothing the peaks and evenly distributing the demands across multiple time-periods (e.g., smoothing), older infrastructures can be configured to handle increases in demand, without structural changes to the system.

To determine a peaking factor, the server 106 may utilize the received water usage data to determine various types of peaking factors. Such peaking factors may include, but are not limited to: peaking factors that compare outdoor to indoor water usage, monthly overall water usage to an indoor water usage baseline, daily outdoor water usage to daily overall water usage, daily overall water usage to baseline annual water usage. As can be seen from this description, various types of peaking factors may be determine with respect to a ratio including various types of water (e.g., indoor vs. outdoor), various time periods, and/or various combinations of types of water and time periods. The server 106 may utilize the water usage data to perform various computations and/or calculations to determine the peaking factor (e.g., calculating a ratio). In some examples, the peaking factor may be computed based on various vectors that represent water usage over certain time-periods. Each vector may represent water usage according to a watering schedule that includes a watering time length and/or a start time or according to a zone characteristic. The zone characteristic may be a native plants zone characteristic, a grass zone characteristic, or a potable water zone characteristic. Other zone characteristics may include flow rate, stress threshold (e.g., user selection on plant stress or health), root zone depth information, water capacity or soil type, crop coefficient, nozzle type, or the like. A peaking factor may be expressed as a relative measure of million gallons per day ("MGD) of water or directly as an MGD numerical quantity.

After the operation 408, the server 106 determines whether the peaking factor passes a threshold water usage at operation 412. A threshold water usage may refer to a water usage at which additional water usage leads to peak load or peak demand of water. For example, a threshold water usage at the flow controller 102a-102n may be 1 MGD. If water usage passes above the threshold water usage, then the system 100 experiences peak demand or peak load. From the perspective of the peak load or peak demand being represented as a peaking factor over a period of time, the method 400 may adjust the water usage such that the peaking factor is compensated to provide water to an infrastructure at a baseline water usage rate. Accordingly, the threshold water usage may be viewed as a cap on the water usage over time, with the peaking factor(s) being smoothed to compensate for fluctuations in load or demand of the water infrastructure. To determine whether the peaking factor passes a threshold water usage at operation 412, the server 106 may compensate a peaking factor for adjustment of the watering schedules. If the peaking factor is compensated to bring water usage below the threshold water usage, the flow of method 400 process to operation 416 where the server 106 adjusts the plurality of watering schedules of the flow controllers 102a-102n. If the peaking factor is not compensated below a threshold water usage, the method 400 may continue computing or calculating adjustments to the watering schedules to compensate the peaking factor.

In some examples, the server 106 may compensate the peaking factor according to various characteristics of the watering schedule or property type being watering. For example, to compensate the peaking, the server 106 may optimize and/or adjust characteristics of at least one watering schedule of the flow controller 102a-102n. Such characteristics of the watering schedule may include, but are not limited to: a start time of the watering schedule, a stop time of the watering schedule, an offset (e.g., a delay) of the watering schedules, a watering time length, a watering water pressure, a frequency of the watering schedule, or an aspect of the outdoor or indoor water usage (e.g., stopping outdoor water usage but allowing indoor water usage to be provided as scheduled).

Additionally or alternatively, the server 106 may optimize and/or adjust aspects of at least one watering schedule of the flow controller 102a-102n based on a zone characteristic. A zone characteristic may be any characteristic in which a property with a connected flow controller 102a-102n is classified. For example, zones may be classified according to: types of vegetation (e.g., native plants zone characteristic or a grass zone characteristic), types of water (e.g., potable vs. non-potable), weather zones, or zones classified according to a connected valve controlled by a particular controller.

Figure 9:
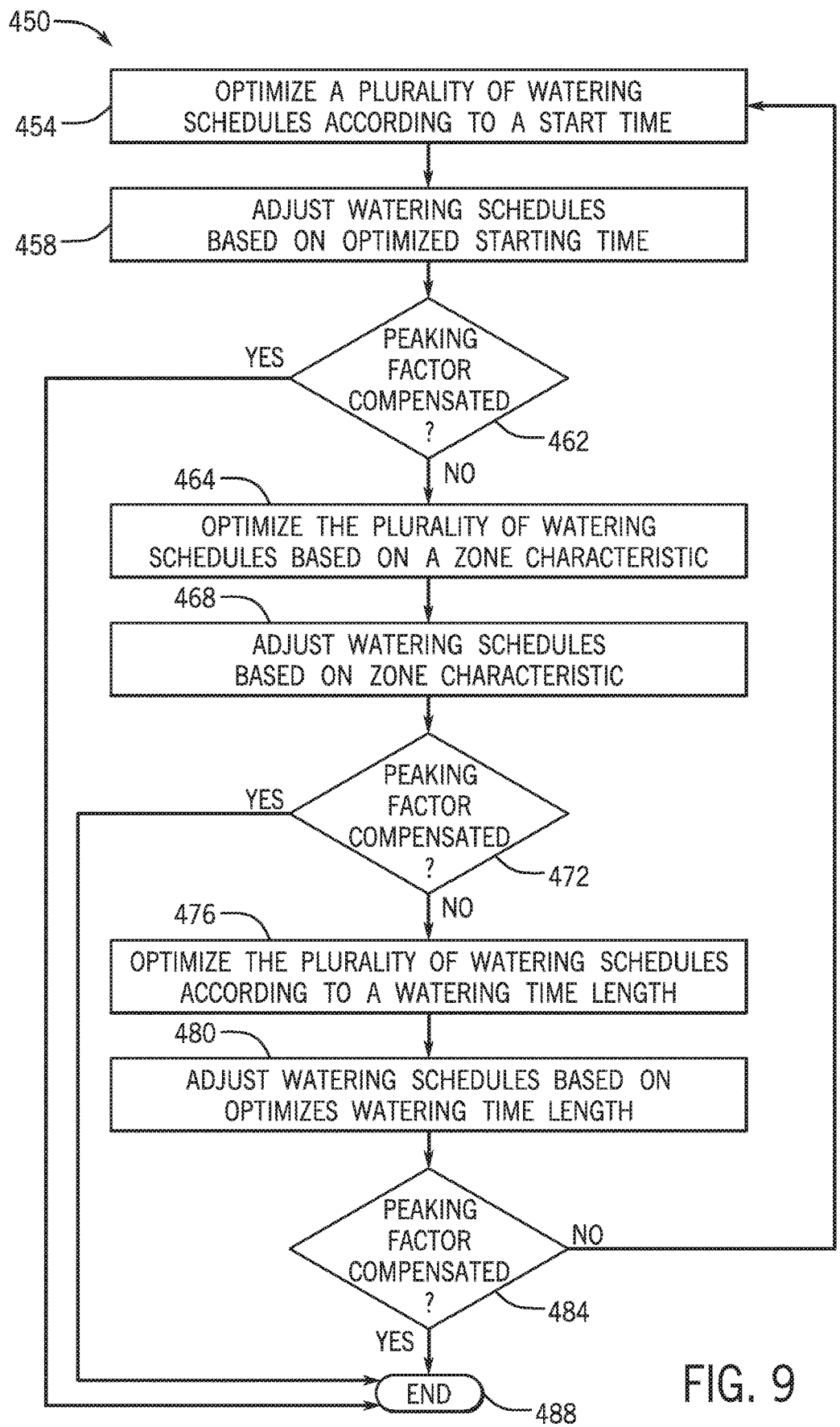
FIG. 9 is a flow chart illustrating a method for compensating a peaking factor.

Additionally or alternatively, zones may also classify certain properties (e.g., a selection of properties) associated with a particular user characteristic of the respective property. For example, certain properties connected to the flow controller 102a-102n may be associated with users (e.g., owners) of the properties that have opted-in to receiving adjustments to their respective watering schedules. In some examples, certain properties may be selected as properties in particular zone by the server 106 based on their association with a certain aspects of a water infrastructure, such as a particular valve or flow controller. In another example, certain properties may be selected as properties in particular zone according to their association with a peaking factor (e.g., a local peaking factor particular to the geographic region). For example, a system-wide water event could be associated with a peaking factor. The server 106 may receive an indication from the computation of the peaking factor or the water usage data that an event has occurred. In such a case, due to the event, the server 106 may select, as a zone, particular properties that could be affected by the event and/or compensate the peaking factor. Events may include a water shortage, water contamination (e.g., in a reservoir), increased water demand from certain geographic regions and/or localities, or any security-related event (e.g., possible security breach at water reservoir). Accordingly, the server 106 may compensate the peaking factor according to various characteristics of the watering schedule and/or zone of a property. The server 106 may optimize and/or adjust the watering schedules in accordance with various possible methods. An example method 450 for compensating a peaking factor is shown in FIG. 9.

Referring now to FIG. 8, the method 450 illustrates an example flow of the server 106 determining to compensate a peaking factor at operation 412. Method 450 illustrates an iterative method beginning at operation 454 and ending at the end operation 488, once the peak factor has been compensated by at least optimizing and adjusting at least one aspect of the watering schedules. The watering schedules optimized and adjusted by the server 106 may include schedules for irrigation and other outdoor usage, as well optionally indoor water use schedules, such as run times for washing machines, dishwashers, and other elements. In embodiments where the watering schedule corresponds to an irrigation schedule, the schedule includes times, dates, and run-times for various sprinkler valves, which may be determined by sprinkler zones having multiple valves, or on a valve-by-valve basis. The method 400 begins at operation 454. At operation 454, the server 106 optimizes watering schedules according to a start time. The server 106 may compute or calculate individual start times for various watering schedules to compensate an identified peaking factor.

As an example of the operation 454, for an identified hourly peaking factor in the afternoon hours, the server 106 may optimize the flow controllers 102a-102n for certain properties 130a-130n to activate at certain morning hours in the day, and other flow controllers for other properties may be set to activate on evening hours of that same day. In this manner, each of the properties 130a-130n served by the main supply 122 may be alternatingly activated, such that the properties that were to be activated in the afternoon hours are not activated during the identified hourly peaking factor. This spaces out the demand on the system, allowing for the system to compensate a peaking factor. In a specific example, the flow controller 102a-102n adjusts the watering schedule for one or more properties 130a-130n to adjust for peak demand on the main supply 122.

In optimizing the watering schedules at operation 454, the server 106 may determine which options are available. Continuing in the same example, the server 106 may have utilized conditions different conditions for the optimization: the properties that were to be activated in the afternoon hours may be activated in solely the evening hours; or, solely the morning hours. In the optimization process, however, the server 106 may determine that the split solution (e.g., activating some in the morning hours and some in the evening hours) obtained a minimal flow in comparison to either of the sole solutions (e.g., solely evening hours or solely morning hours). In optimizing this least cost solution, the server 106 may utilize a least-squares optimization or other optimization techniques (e.g., a convex optimization technique) to determine optimized watering schedules according to a start time.

After operation 454, the flow of method 400 proceeds to operation 458. At operation 458, the server 106 adjusts the watering schedules based on the optimized starting time. For example, the server 106 adjusts one or more settings for each of the flow controllers 102a-102n. The settings may include watering amounts, watering schedules, notification types or frequency, providing usage information to property owners, or the like. In such an example, the server 106 may specifically adjust a setting related to a start time, offset, delay, and/or stop time. The types of settings that may be adjusted may be varied based on the optimized start time.

After operation 458, the server 106 determines whether a peaking factor has been compensated at operation 462. The server 106 may compute whether the water usage included in the adjusted watering schedules falls below a threshold water usage. For example, a threshold water usage at the flow controller 102a-102n may be 1 MGD. If water usage falls below the threshold water usage, then the peaking factor has been compensated. If the peaking factor has been compensated, the method 450 may proceed along the "YES" flow to the end operation 488. At the end operation 488, the method 450 ends; and the server 106 proceeds with method 400 after operation 412. However, if the peaking factor has not been compensated, the method 450 proceeds to operation 464 along the "NO" flow from operation 462.

At operation 464, the server 106 optimizes watering schedules based on a zone characteristic. To optimize the watering schedules based on a zone characteristic, the server 106 may classify watering schedules for different zones to compensate an identified peaking factor. Zones include classifications of any characteristic in which a property with a connected flow controller 102a-102n is classified. Some zones are classified based on an association with a particular user characteristic of the respective property (e.g., a local peaking factor particular to the geographic region). As an example of the operation 464, for a particular zone with opted-in users of flow controllers 102a-102n, the server 106 may optimize the flow controllers 102a-102n to activate the flow controllers of the connected properties of the flow controllers 102a-102n, in coordination with activation of a zone classified as a grass zone at a non-peak time. This grass zone may be selected by the server 106, as a zone with fewer properties than other zones. In some examples, a zone may be selected by the server 106 to optimize the watering schedules with more properties, depending on the severity of the peaking factor relative to other peaking factors. Accordingly, grass zone may be scheduled to be watered at a different time other than peak demand, as indicated by the peaking factor. This reduces the overall water usage for the infrastructure, while ensuring that the grass zones are watered at some scheduled time. As part of the example of method 450, the server 106 may optimize this zone characteristic, in addition to the optimized start times in operation 454. For example, the grass zone may be selected to optimize the watering schedules, in addition to the adjusted start times for some properties in the morning hours and others in the evening hours, described with respect to operation 454.

After operation 464, the flow of method 400 proceeds to operation 468. At operation 468, the server 106 adjusts the watering schedules based on the zone characteristic. For example, the server 106 adjusts one or more settings for each of the flow controllers 102a-102n. The settings may include watering amounts, watering schedules, notification types or frequency, providing usage information to property owners, or the like. In such an example, the server 106 may specifically adjust a setting related to a zone characteristic. For example, the server 106 may activate a flag of an individual flow controller 102a-102n having the zone characteristic. The types of settings that may be adjusted may be varied based on the zone characteristic.

After operation 468, the server 106 determines whether a peaking factor has been compensated at operation 472. The server 106 may compute whether the water usage included in the adjusted watering schedules falls below a threshold water usage. For example, a threshold water usage at the flow controller 102a-102n may be 1 MGD. If water usage falls below the threshold water usage, then the peaking factor has been compensated. If the peaking factor has been compensated, the method 450 may proceed along the "YES" flow to the end operation 488. At the end operation 488, the method 450 ends; and the server 106 proceeds with method 400 after operation 412. However, if the peaking factor has not been compensated, the method 450 proceeds to operation 476 along the "NO" flow from operation 472.

At operation 476, the server 106 optimizes watering schedules according to a watering time length. The server 106 may compute or calculate individual watering time lengths for various watering schedules to compensate an identified peaking factor. As an example of the operation 476, for an identified hourly peaking factor in the afternoon hours, the server 106 may optimize the flow controllers 102a-102n for certain properties 130a-130n to reduce the watering time of the watering schedules associated with the afternoon hours to a short time period than originally scheduled. Accordingly, if the watering schedules associated with the afternoon hours were to be watered for one hour, the watering time lengths may be reduced to a half hour. In optimizing this schedule, the server 106 may determine which options are available. This spaces out the demand on the system, allowing for the system to compensate a peaking factor. As part of the example of method 450, the server 106 may optimize this watering time length, in addition to the optimized start times in operation 454 and zone characteristic in operation 464. For example, the adjusted watering time length of a half hour for the watering schedules associated with the afternoon hours may be selected to optimized the watering schedules, in addition to the native plants zone and adjusted start times for some properties in the morning hours and others in the evening hours, described with respect to operations 454 and 468.

After operation 476, the flow of method 400 proceeds to operation 480. At operation 480, the server 106 adjusts the watering schedules based on the optimized watering time lengths. For example, the server 106 adjusts one or more settings for each of the flow controllers 102a-102n. The settings may include watering amounts, watering schedules, notification types or frequency, providing usage information to property owners, or the like. In such an example, the server 106 may specifically adjust a setting related to a watering time lengths. The types of settings that may be adjusted may be varied based on the optimized watering time length.

After operation 480, the server 106 determines whether a peaking factor has been compensated at operation 484. The server 106 may compute whether the water usage included in the adjusted watering schedules falls below a threshold water usage. For example, a threshold water usage at the flow controller 102a-102n may be 1 MGD. If water usage falls below the threshold water usage, then the peaking factor has been compensated. If the peaking factor has been compensated, the method 450 may proceed along the "YES" flow to the end operation 488. At the end operation 488, the method 450 ends; and the server 106 proceeds with method 400 after operation 412. However, if the peaking factor has not been compensated, the method 450 proceeds back to the start of method 450 at operation 454 along the "NO" flow from operation 484.

As can be appreciated, the method 450 may continue iteratively until the watering schedules fall below a threshold water usage or until a set time to optimize expires. For example, the server 106, executing the method 450 as a set of instructions, may receive a time-out flag from a clock that track a set time for optimization of the watering schedules. At the end of method 450 at operation 488 or when the method 450 times out, the flow of method 400 may continue at operation 416, proceeding from the operation 412 that initiated the method 450. In the method 450, the flow of determining whether a peaking factor has passed a threshold water usage may be viewed as preferential to various characteristics of the watering schedule, the property type being watering, or a zone characteristic. With respect to the example of method 450, the order in that method was to optimize, first, watering start time; second, zone characteristic; and third, watering time length. It can be appreciated that various optimizations and orders may be selected for characteristics of the watering schedule, the property type being watering, or a zone characteristic. Accordingly, additional example methods may optimize for two, four, or ten characteristics; and such characteristic may be ordered according to various permutations.

Referring again now to FIG. 9, the method 400 continues with operation 416. At operation 416, the server 106 adjusts watering schedules of the flow controllers 102a-102n. At operation 468, the server 106 adjusts the watering schedules, for example, according to a starting time or watering time length or based on the zone characteristic. In adjusting the watering schedules, the server 106 generates an update to the watering schedules to provide to individual flow controllers. The server 106 adjusts, in an update, one or more settings for each of the flow controllers 102a-102n. The settings may include watering amounts, watering schedules, notification types or frequency, providing usage information to property owners, or the like. The server 106 may configure instructions that set a flag in a setting of an individual flow controller 102a-102n related to characteristics of the watering schedule, the property type being watering, or a zone characteristic. In the example including the method 450, the server 106 may specifically adjust some settings of flow controllers related to a start time, watering time length, or zone characteristic that has been optimized by the server 106.

After operation 416, the method 400 may proceed to operation 420. In operation 420, the server 106 may transmit the updated schedule or settings to the flow controller 102a-102n and/or user devices 108a-108n. For example, if the server 106 communicates the updated watering schedules or settings to the flow controller 102a-102n, the flow controller 102a-102n may also transmit the schedule or settings either directly to the user devices 108a-108n. The transmission to the flow controller 102a-102n may include the updated watering schedules. Aspects of the watering schedules transmitted to the flow controller 102a-102n may be varied as desired. For example, the update to a watering schedule may only include an update regarding a zone characteristic (e.g., water-related event in a geographic region). The sever 106 may push the settings changes to multiple controllers 102a-102n simultaneously, individually, or in select groupings (see FIGS. 4, 6, and 7). Notifications may also be sent to the user devices 108a-108n regarding any updated watering schedule.

With continued reference to FIG. 9, after operation 420, the method 400 may proceed to operation 424. In operation 424, the server 106 determines whether feedback has been received. For example, the server 106 may check every day or other select time period for updated data that varies the water usage data. The server 106 may receive additional water usage data from an infrastructure database regarding the update to the watering schedules. If the feedback received indicates that a peaking factor has not been compensated, the flow of method 400 proceeds along the "YES" branch back to operation 421 to determine a peaking factor that passes below a threshold water usage. If, however, the feedback received indicates that a peaking factor has been compensated, flow process along the "NO" branch and the method 400 ends at end operation 428. If the flow controllers 102a-102n are to be updated, the method 250 returns to operation 254. However, if the flow controllers 102a-102n do not need to be updated, the method 250 may return to operation 260 and continue to operate the flow controllers 102a-102n.

Using the methods 400, 450 of FIGS. 8 and 9, the system 100 can optimize watering schedules for various properties 130a-130n that can allow overtaxed infrastructure to be able to accommodate current demand, as well as expanding demands. As shown in FIG. 5, outdoor water usage, such as a due to irrigation, peak demand can be 2.5 to 3 times that of the baseline usage (e.g., typical indoor usage 272). As shown in FIG. 5, outdoor watering can generate a large demand on the infrastructure and main supply 122 for small periods of time. By using the methods 400, 450 the outdoor demand can be more evenly spaced across time to reduce the demand peaks, reducing the peak load on the main supply 122 and other components of the water infrastructure.

The server 106 may utilize the methods 400 and 450 iteratively, at varying frequencies, to adjust and transmit watering schedules to flow controllers. For example, the server 106, executing the method 400 as a set of instructions, may request (e.g., a software call) to be executed upon receiving additional usage data or upon receiving feedback from infrastructure databases at operation 424. In receiving such additional data (e.g., usage data or feedback), the server 106 may update the peaking factor, such that it determines an updated peaking factor. In some examples, the peaking factor may be represented in a watering model for the water infrastructure. In such a case, the watering model may be updated with the updated peaking factor.

Figure 10:
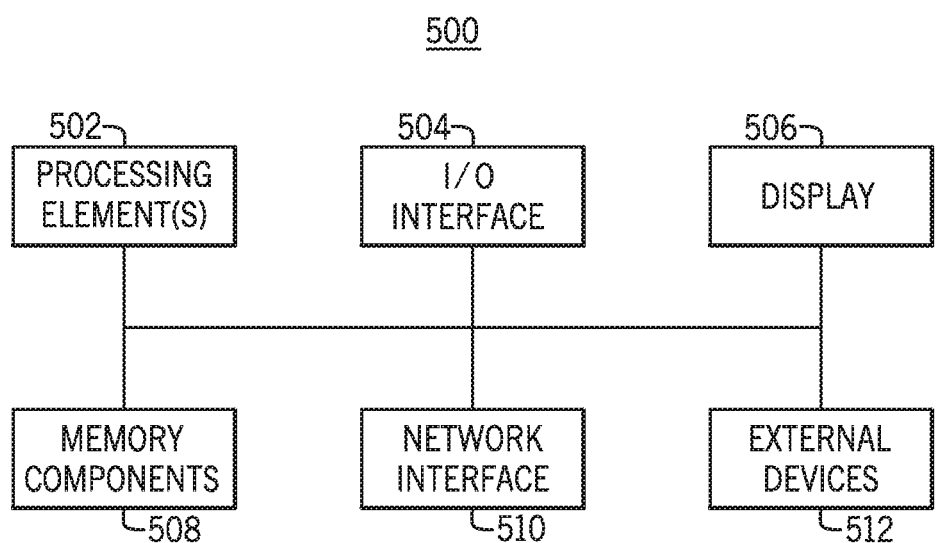
FIG. 10 is a simplified block diagram of a computing device that can be used by one or more components of the system of FIG. 1.

A simplified block structure for a computing device that may be used with the system 100 or integrated into one or more of the system 100 is shown in FIG. 10. For example, the server 106, user devices 108a-108n, flow controllers 102a-102n, and/or infrastructure databases 112 may include one or more of the components shown in FIG. 10 and be used to execute one or more of the operations disclosed in methods 200, 250, 300, 310, 400, 450. With reference to FIG. 10, the computing device 500 may include one or more processing elements 502, an input/output interface 504, a display 506, one or more memory components 508, a network interface 510, and one or more external devices 512. Each of the various components may be in communication with one another through one or more busses, wireless means, or the like.

The processing element 502 is any type of electronic device capable of processing, receiving, and/or transmitting instructions. For example, the processing element 502 may be a central processing unit, microprocessor, processor, or microcontroller. Additionally, it should be noted that select components of the computer 500 may be controlled by a first processor and other components may be controlled by a second processor, where the first and second processors may or may not be in communication with each other.

The memory components 508 are used by the computer 500 to store instructions for the processing element 502, as well as store data, such as the fluid device data, historical data, and the like. The memory components 508 may be, for example, magneto-optical storage, read-only memory, random access memory, erasable programmable memory, flash memory, or a combination of one or more types of memory components.

The display 506 provides visual feedback to a user and, optionally, can act as an input element to enable a user to control, manipulate, and calibrate various components of the computing device 500. The display 506 may be a liquid crystal display, plasma display, organic light-emitting diode display, and/or cathode ray tube display. In embodiments where the display 406 is used as an input, the display may include one or more touch or input sensors, such as capacitive touch sensors, resistive grid, or the like.

The I/O interface 504 allows a user to enter data into the computer 500, as well as provides an input/output for the computer 500 to communicate with other devices (e.g., flow controller 104, flow detector 102, other computers, speakers, etc.). The I/O interface 504 can include one or more input buttons, touch pads, and so on.

The network interface 510 provides communication to and from the computer 500 to other devices. For example, the network interface 510 allows the server 110 to communicate with the flow controller 104 and the flow detector 102 through the network 114. The network interface 510 includes one or more communication protocols, such as, but not limited to WiFi, Ethernet, Bluetooth, and so on. The network interface 510 may also include one or more hardwired components, such as a Universal Serial Bus (USB) cable, or the like. The configuration of the network interface 510 depends on the types of communication desired and may be modified to communicate via WiFi, Bluetooth, and so on.

The external devices 512 are one or more devices that can be used to provide various inputs to the computing device 500, e.g., mouse, microphone, keyboard, trackpad, or the like. The external devices 512 may be local or remote and may vary as desired.

CONCLUSION

The foregoing description has broad application. For example, while examples disclosed herein may focus on residential water systems, it should be appreciated that the concepts disclosed herein may equally apply to other water systems, such as commercial properties. Similarly, although the system is discussed with respect to water sources, the system and methods may be used with substantially any other type of fluid systems. Accordingly, the discussion of any embodiment is meant only to be exemplary and is not intended to suggest that the scope of the disclosure, including the claims, is limited to these examples.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary

What is claimed is:

1. A method for optimizing water usage in a water infrastructure comprising:
   receiving from one or more flow controllers usage data based on watering schedules for a plurality of properties serviced by the water infrastructure;
   utilizing, by a processor, the usage data and a water delivery capacity of the water infrastructure to determine demand peaks on the water infrastructure, wherein the water delivery capacity is based on structural dimensions of the water infrastructure that define a maximum flow rate to the plurality of properties;
   applying, by the processor, a smoothing function to the demand peaks on the water infrastructure, wherein the smoothing function distributes the demand peaks on the water infrastructure over a peak usage time as determined from the usage data and is used to generate an adjusted water usage schedule for the plurality of properties, wherein the adjusted water usage schedule staggers usage times for at least two properties of the plurality of properties during the peak usage time to reduce the demand peaks on the water infrastructure; and
   activating by the one or more flow controllers one or more water outlets for the one or more properties based on the adjusted water usage schedule.

2. The method of claim 1, wherein the one or more water outlets comprise a plurality of sprinkler valves.

3. The method of claim 1, wherein the usage data comprises peak outdoor watering times for a geographic location.

4. The method of claim 3, wherein the usage data comprises water source levels fluidly connected to the water infrastructure, expected growth in population served by the water infrastructure, and historical usage data of the water infrastructure.

5. The method of claim 1, wherein the adjusted water usage schedules for the at least two properties is generated so that watering times are not simultaneous during the peak usage time.

6. The method of claim 1, wherein a first property of the at least two properties activates water use for the first property at a first time and a second property of the at least two properties activates water use for the second property after the first time.

7. The method of claim 1, further comprising dividing the plurality of properties into two or more groups, wherein properties in a group have a similar geographic location and watering demand, and wherein the at least two properties are in different groups.

8. The method of claim 1, wherein at least a portion of the usage times for the at least two properties are non-overlapping during the peak usage time.

9. The method of claim 1, wherein the structural dimensions of the water infrastructure include a diameter size of flow pipes within the water infrastructure.

10. The method of claim 1, wherein the structural dimensions are a size of pipes delivering water to the plurality of properties.

11. The method of claim 1, wherein the water infrastructure comprises a main water pipeline that delivers water to the plurality of properties and the structural dimensions are based on a size of the main water pipeline.

12. The method of claim 1, wherein the adjusted water usage schedule ensures water usage by the plurality of properties at a given time does not exceed the water delivery capacity.

13. A method for adjusting water usage in a water infrastructure comprising:
receiving, by a processor, water usage data based on watering schedules for two or more properties serviced by the water infrastructure;
determining, by the processor, a peaking factor for water usage, the peaking factor associated with water usage at one or more flow controllers and a water delivery capacity of the water infrastructure, wherein the water delivery capacity is based on structural dimensions of the water infrastructure that define a maximum flow rate to the plurality of properties;
determining, by the processor, that the peaking factor passes a threshold water usage for the one or more flow controllers; and
applying, by the processor, a smoothing function to a peak demand on the water infrastructure based partly on the determination that the peaking factor passed the threshold water usage, wherein the smoothing function distributes the peak demand on the water infrastructure over a peak usage time as determined from the usage data and generates a plurality of adjusted watering schedules for the two or more properties, the adjusted watering schedules are associated with a corresponding flow controller of the one or more flow controllers and generating the plurality of adjusted watering schedules comprises staggering watering times for the two or more properties during the peak usage time to reduce the peak demand on the water infrastructure.

14. The method of claim 13, wherein the water usage data comprises usage data from a plurality of pressure sensors of the water infrastructure, the method further comprising:
determining an updated peaking factor for water usage associated with the one or more flow controllers based at least partly on the usage data; and
adjusting the plurality of watering schedules based partly on the updated peaking factor.

15. The method of claim 13, wherein the usage data comprises water trend data from a water utility, the watering schedules, or forecasted weather data.

16. The method of claim 13, wherein generating the plurality of adjusted watering schedules comprises:
optimizing the watering schedules based on a zone characteristic associated with a selection of properties; and
generating the plurality of adjusted watering schedules based on the zone characteristic.

17. The method of claim 16, wherein the zone characteristic comprises at least one of a native plants zone characteristic, a grass zone characteristic, or a potable water zone characteristic.

18. The method of claim 16, wherein the selection of properties comprises at least one of a selection of opt-in properties, a selection of properties including at least one of the one or more flow controllers, or a selection of properties associated with the peaking factor.

19. The method of claim 16, wherein determining the peaking factor for water usage comprises calculating a ratio including a type of water usage over a time period and an overall water usage for a different time period.

20. The method of claim 13, further comprising:
optimizing the watering schedules according to a start time for at least one of the plurality of watering schedules; and
generating the plurality of adjusted watering schedules based on a plurality of optimized start times.

21. The method of claim 13, further comprising:
optimizing the watering schedules according to a watering time length for at least one of the watering schedules; and
generating the plurality of adjusted watering schedules based on a plurality of optimized watering time lengths.

22. The method of claim 13, wherein the peaking factor includes an event indication based on a water-related event, the method further comprising:
receiving the event indication regarding the water-related event from a water utility; and
generating the plurality of adjusted watering schedules based partly on the determination that the peaking factor passed the threshold water usage and based partly on a selection of properties associated with the event indication.

23. The method of claim 22, wherein the event affecting water flow comprises a water shortage, water contamination, increased water demand from a geographic region, or a security-related event.

24. The method of claim 22, wherein the selection of properties comprises at least one of a selection of opt-in properties, a selection of properties including at least one of the one or more flow controllers, a selection of properties associated with the peaking factor, or all properties associated with the water infrastructure.

25. The method of claim 13, further comprising:
transmitting the plurality of adjusted watering schedules; and
transmitting a notification to a user associated with each adjusted watering schedule.

26. An apparatus, comprising:
a server coupled to infrastructure databases and a plurality of flow controllers for two or more properties having a shared water infrastructure, each flow controller of the plurality of flow controllers connected to at least one water outlet of a plurality of water outlets, the server including a non-transitory computer readable media and configured to execute instructions stored on the non-transitory computer readable media, the instructions comprising:
determining a peaking factor for water usage based partly on water usage data received from at least one flow controller of the plurality of flow controllers and a water delivery capacity of the shared water infrastructure, wherein the water usage data is based on watering schedules for the two or more properties and the water delivery capacity is based on structural dimensions of the shared water infrastructure that define a maximum flow rate to the two or more properties; and
applying a smoothing function to a demand on the shared water infrastructure to distribute the demand over a period of time and generate two or more adjusted watering schedules for the two or more properties, each adjusted watering schedule associated with a corresponding flow controller of the plurality of flow controllers, wherein generating the two or more adjusted watering schedules comprises adjusting a first watering schedule for a first property of the two or more properties so as to be non-coextensive with a second watering schedule for a second property of the two or more properties during a peak usage time as determined from the water usage data to reduce the demand on the shared water infrastructure.

27. The apparatus of claim 26, wherein generating the two or more adjusted watering schedules comprises:
   generating an update to a watering model including the two or more adjusted watering schedules; and
   transmitting the update to the watering model to at least one flow controller of the plurality of flow controllers.

28. The apparatus of claim 26, wherein the server is connected to infrastructure databases storing additional water usage data thereon, the additional water usage data comprising environmental factors, utility information, water reservoir information, or water source information, wherein determining the peaking factor for water usage comprises determining the peaking factor based partly on the water usage data received from at least one flow controller and the additional water usage data.

* * * * *